(12) United States Patent
Lee et al.

(10) Patent No.: US 11,861,504 B2
(45) Date of Patent: Jan. 2, 2024

(54) APPARATUS FOR PERFORMING CLASS INCREMENTAL LEARNING AND METHOD OF OPERATING THE APPARATUS

(71) Applicants: Samsung Electronics Co., Ltd., Suwon-si (KR); Seoul National University R&DB Foundation, Seoul (KR)

(72) Inventors: Donghyun Lee, Seoul (KR); Euntae Choi, Seoul (KR); Kyungmi Lee, Cambridge, MA (US); Kiyoung Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 913 days.

(21) Appl. No.: 16/830,480

(22) Filed: Mar. 26, 2020

(65) Prior Publication Data

US 2020/0401900 A1 Dec. 24, 2020

(30) Foreign Application Priority Data

Jun. 18, 2019 (KR) .......................... 10-2019-0072422

(51) Int. Cl.
*G06N 3/08* (2023.01)
*G06N 3/088* (2023.01)
*G06N 3/04* (2023.01)

(52) U.S. Cl.
CPC ............... *G06N 3/088* (2013.01); *G06N 3/04* (2013.01)

(58) Field of Classification Search
CPC .......... G06N 3/04; G06N 3/045; G06N 3/084; G06N 3/088
See application file for complete search history.

(56) References Cited

U.S. PATENT DOCUMENTS

| 10,055,685 B1 | 8/2018 | Arel et al. |
| 2018/0357538 A1 | 12/2018 | Hwang et al. |

(Continued)

FOREIGN PATENT DOCUMENTS

| KR | 10-2018-0134739 A | 12/2018 |
| WO | WO 2018/175698 A1 | 9/2018 |

OTHER PUBLICATIONS

Zhou et al., "Density-aware Local Siamese Autoencoder Network Embedding with Autoencoder Graph Clustering", Jan. 24, 2019, 2018 IEEE International Conference on Big Data (Big Data), pp. 1162-1167. (Year: 2019).*

(Continued)

*Primary Examiner* — Brent Johnston Hoover
(74) *Attorney, Agent, or Firm* — NSIP Law

(57) ABSTRACT

A method of performing a class incremental learning in a neural network apparatus, the method including training an autoencoder using first input embeddings with respect to a first class group, calculating a contribution value of each of parameters of the autoencoder and calculating a representative value with respect to each of at least one first class included in the first class group in the training of the autoencoder, retraining the autoencoder using second input embeddings with respect to a second class group, and updating the contribution value of the each of the parameters and calculating a representative value with respect to each of at least one second class included in the second class group in the retraining the autoencoder.

20 Claims, 8 Drawing Sheets

(56) References Cited

U.S. PATENT DOCUMENTS

2019/0034798 A1    1/2019  Yu et al.
2019/0156211 A1*  5/2019  Dong ..................... G06N 3/084
2020/0364611 A1*  11/2020  Cho ...................... G06N 3/045

OTHER PUBLICATIONS

Li et al., "Incremental semi-supervised learning on streaming data", Apr. 2019, Pattern Recognition, vol. 88, Apr. 2019, pp. 383-396. (Year: 2019).*

Zenke, Friedemann et al., "Continual Learning Through Synaptic Intelligence", *Proc Mach Learn Res.* 2017 (pp. 3987-3995).

Zacaria, Abel et al., "SeNA-CNN: Overcoming Catastrophic Forgetting in Convolutional Neural Networks by Selective Network Augmentation", *IAPR Workshop on Artificial Neural Networks in Pattern Recognition*, Aug. 30, 2018 (pp. 102-112).

* cited by examiner

APPARATUS FOR PERFORMING CLASS INCREMENTAL LEARNING AND METHOD OF OPERATING THE APPARATUS

CROSS-REFERENCE TO RELATED APPLICATION

This application claims the benefit under 35 USC § 119(a) of Korean Patent Application No. 10-2019-0072422 filed on Jun. 18, 2019, in the Korean Intellectual Property Office, the entire disclosure of which is incorporated herein by reference for all purposes.

BACKGROUND

1. Field

The present disclosure relates to apparatuses for performing a class incremental learning and methods of operating the apparatus.

2. Description of Related Art

Research is being actively conducted to classify input patterns in groups so that efficient pattern recognition may be performed on computers. This includes research on an artificial neural network (ANN) that is obtained by modeling pattern recognition characteristics using mathematical expressions. The ANN may employ an algorithm that mimics abilities to learn. The ANN generates mapping between input patterns and output patterns using an algorithm, and a capability of generating the mapping is expressed as a learning capability of the ANN. Also, the ANN has a capability to generate a relatively correct output with respect to an input pattern that has not been used for training based on a result of previous training. As ANN technology develops, input data analysis and extraction of valid information are performed in various types of electronic devises by utilizing a neural network.

When an ANN is retaught after learning about a neural network is completed, a catastrophic forgetting phenomenon, that is, loss of all information about existing learning, may occur as classes are incremented. Studies about structures of neural networks and learning methods that enable class incremental learning are being conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing a class incremental learning in a neural network apparatus, the method including training an autoencoder using first input embeddings with respect to a first class group, calculating a contribution value of each of parameters of the autoencoder and calculating a representative value with respect to each of at least one first class included in the first class group in the training of the autoencoder, retraining the autoencoder using second input embeddings with respect to a second class group, and updating the contribution value of the each of the parameters and calculating a representative value with respect to each of at least one second class included in the second class group in the retraining the autoencoder.

The training of the autoencoder may include converting the first input embeddings into latent variables of low dimensions using an encoder, generating first reconstructed embeddings from the latent variables using a decoder, and training the autoencoder by minimizing a first loss function with respect to the autoencoder such that the first reconstruction embeddings coincide with the first input embeddings.

The retraining of the autoencoder may include converting the second input embeddings into latent variables of low dimensions using the encoder, generating second reconstructed embeddings from the latent variables using the decoder, and retraining the autoencoder by minimizing a second loss function with respect to the autoencoder such that the second reconstruction embeddings coincide with the second input embeddings, wherein the second loss function may include a term related to regularization based on an updated contribution value of each of the parameters.

The first loss function and the second loss function may be terms related to cosine similarity with respect to paired latent variables.

The first loss function and the second loss function may be a term related to L1-norm.

The training of the autoencoder may include converting input embeddings with respect to the at least one first class into first latent variables and calculating a first representative value representing the first latent variables, and the retraining of the autoencoder may include converting input embeddings with respect to the at least one second class into second latent variables and calculating a second representative value representing the second latent variables.

The method may include acquiring a test latent variable, in response to inputting test embedding into the autoencoder, determining a representative value, from among the first representative value and the second representative value, having a higher similarity with the test latent variable, and classifying the test embedding into a class corresponding to the determined representative value.

The training of the autoencoder may include converting an input data set with respect to the first class group into the first input embedding representing a vector value, and training the autoencoder using the first input embedding, and the retraining of the autoencoder may include converting an input data set with respect to the second class group into the second input embedding representing another vector value, and retraining the autoencoder using the second input embedding.

The training of the autoencoder may include converting input embeddings with respect to the at least one first class into latent variables and calculating a first representative value representing the latent variables, selecting latent variables having a difference with the first representative value that is less than or equal to a threshold from among the latent variables, and training an autoencoder based on input embeddings corresponding to the selected latent variables.

In another general aspect, there is provided a neural network apparatus that performs a class incremental learning, the neural network apparatus including a processor configured to train an autoencoder using first input embeddings with respect to a first class group, calculate a contribution value of each of parameters of the autoencoder and a representative value with respect to each of at least one first class included in the first class group in the training of the autoencoder, retrain an autoencoder using second input embeddings with respect to a second class group, and update the contribution value of the each of the parameters and to calculate a representative value with respect to each of at least one second class included in the second class group in retraining the autoencoder.

The processor may be configured to convert first input embeddings into latent variables of low dimensions using an encoder, generate first reconstructed embeddings from the latent variables using a decoder, and train the autoencoder by minimizing a first loss function with respect to the autoencoder such that the first reconstruction embeddings coincide with the first input embeddings.

The processor may be configured to convert the second input embeddings into latent variables of low dimensions using the encoder, generate second reconstructed embeddings from the latent variables using the decoder, and retrain the autoencoder by minimizing a second loss function with respect to the autoencoder such that the second reconstructed embeddings coincide with the second input embeddings, wherein the second loss function may include a term related to regularization based on an updated contribution value of each of the parameters.

The first loss function and the second loss function may include terms related to cosine similarity with respect to paired latent variables.

The first loss function and the second loss function may include a term related to L1-norm.

The processor may be configured to converts input embeddings with respect to the at least one first class into first latent variables and to calculate a first representative value representing the first latent variables in training the autoencoder, and convert input embeddings with respect to the at least one second class into second latent variables and to calculate a second representative value representing the second latent variables in retraining the autoencoder.

The processor may be configured to acquire a test latent variable, in response to inputting test embedding into the autoencoder, determine a representative value, from among the first representative value and the second representative value, having a higher similarity with the test latent variable, and classify the test embedding into a class corresponding to the determined representative value.

The processor may be configured to convert an input data set with respect to the first class group into the first input embedding representing a vector value, train the autoencoder using the first input embedding, convert an input data set with respect to the second class group into the second input embedding that represents another vector value, and retrain the autoencoder using the second input embedding.

The processor may be configured to convert input embeddings with respect to the at least one first class into latent variables and to calculate a first representative value representing the latent variables, select latent variables having a difference with the first representative value that is less than or equal to a threshold from among the latent variables, and train an autoencoder based on input embeddings corresponding to the selected latent variables.

The neural network apparatus may include a memory configured to store the contribution value of each of the parameters and the representative value.

Other features and aspects will be apparent from the following detailed description, the drawings, and the claims.

Figure 1:
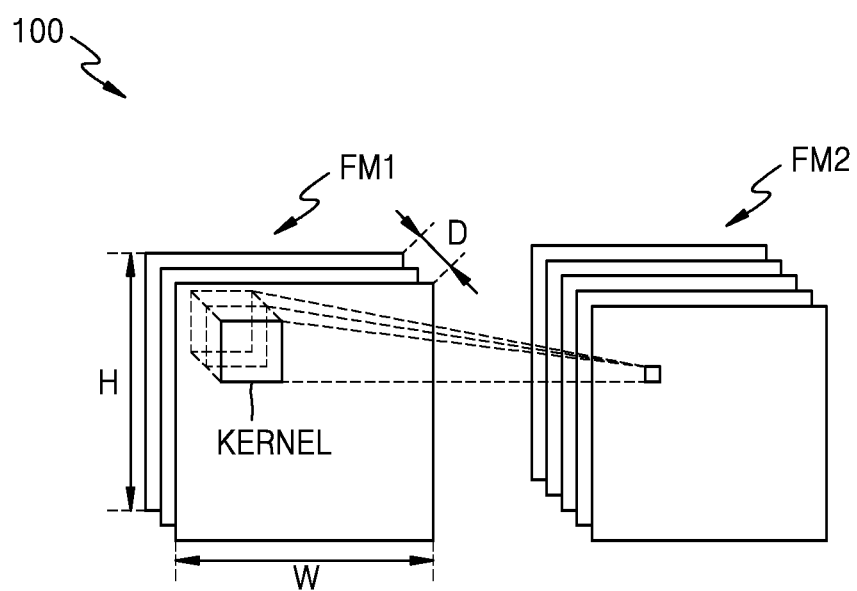
FIG. 1 is a diagram illustrating an example of a relationship between an input feature map and an output feature map in a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The use of the term 'may' herein with respect to an example or embodiment, e.g., as to what an example or embodiment may include or implement, means that at least one example or embodiment exists where such a feature is included or implemented while all examples and embodiments are not limited thereto.

It should be understood that, when a part "comprises" or "includes" an element in the specification, unless otherwise defined, other elements are not excluded from the part and the part may further include other elements. Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Reference will now be made in detail to the following embodiments, examples of which are illustrated in the accompanying drawings. The embodiments may, however, be embodied in many different forms and should not be construed as being limited to the following description.

FIG. 1 is a diagram illustrating an example of a relationship between an input feature map and an output feature map in a neural network 100.

The neural network 100 may be trained to perform a desired operation by mapping input data and output data that have a nonlinear relationship therebetween through deep learning to perform tasks such as, for example, object classification, object recognition, audio or speech recognition, and image recognition. The deep learning is a machine learning method used to solve a problem given from a big dataset. The deep learning may also be construed as a problem-solving process for optimization to find a point where energy is minimized while training the neural network using provided training data. Through the deep learning, for example, supervised or unsupervised learning, a weight corresponding to an architecture or a model of the neural network may be obtained, and the input data and the output data may be mapped to each other based on the obtained weight.

In an example, the neural network 100 may be implemented as an architecture having a plurality of layers including an input image, feature maps, and an output. In the neural network 100, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

The term "recognition" is used as a concept including verification and identification. The verification is an operation of determining whether input data is true of false. For example, the verification may be an operation of determining whether input data is true or false. The identification is an operation of determining a label indicated by input data from among a plurality of labels. For example, the neural network is a model that receives a sequence and performs operations such as, for example, translation, interpretation, and speech recognition.

In another example, the neural network 100 may include an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network. Input data for the neural network 100 may include image data, voice data, and text data. However, they are provided as examples only, and other types of data are considered to be well within the scope of the present disclosure.

Referring to FIG. 1, a first feature map FM1 may correspond to an input feature map and a second feature map FM2 may correspond to an output feature map of the neural network 100. A feature map may denote a data set in which various features of input data are expressed. The first and second feature maps FM1 and FM2 may have elements of a two-dimensional matrix or elements of a three-dimensional matrix, and a pixel value may be defined in each of the elements. The first and second feature maps FM1 and FM2 may have a width W (or a column), a height H (or a row), and a depth D. In an example, the depth D may correspond to the number of channels.

In an example, a convolution operation with respect to the first feature map FM1 and a kernel may be performed, and as a result, the second feature map FM2 may be generated. In an example, the kernel is defined in each element and filters features of the first feature map FM1 by performing a convolution operation with the first feature map FM1. In an example, the kernel performs a convolution operation with windows (or referred to as tiles) of the first feature map FM1 while shifting the first feature map FM1 in a sliding window manner. During each shift, each pixel value included in the kernel may be multiplied and added with each of the pixel values of the overlapped window in the first feature map FM1. As the first feature map FM1 and the kernel are convolved, one channel of the second feature map FM2 may be generated. In FIG. 1, although one kernel is depicted, in practice, each of the plurality of kernels may be convolved with the first feature map FM1, and thus, the second feature map FM2 of the plurality of channels may be generated.

Meanwhile, the second feature map FM2 may correspond to an input feature map of the next layer. For example, the second feature map FM2 may be an input feature map of a pooling (or subsampling) layer.

In FIG. 1, for convenience of explanation, only a schematic architecture of a neural network is depicted. However, it should be understood that the neural network 100 may be realized with a larger number or fewer number of layers, feature maps, kernels, and also, the sizes thereof may be variously modified. The neural network 100 includes a plurality of layers, each including a plurality of nodes. Also, the neural network includes connection weights that connect the plurality of nodes included in the plurality of layers to a node included in another layer.

The neural network 100 may include, for example, an input layer, at least one hidden layer, and an output layer. The input layer receives an input for performing training or recognition and transfers the input to the hidden layer. The output layer generates an output of the neural network based on a signal received from the hidden layer. The hidden layer is interposed between the input layer and the output layer, and changes data transferred though the input layer to a value to be easily predicted. Input nodes included in the input layer and hidden nodes included in the hidden layer are connected through edges having connection weights. The hidden nodes included in the hidden layer and output nodes included in the output layer are connected through edges having connection weights.

In an example, the neural network 100 may correspond to a recurrent neural network (RNN) or a convolutional neural network (CNN). In an example, the CNN may be a deep neural network (DNN). Ain an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. The plurality of layers may include an input layer, at least one hidden layer, and an output layer. In an example, neural network may include a sub-sampling layer, a pooling layer, a fully connected layer, etc., in addition to a convolution layer.

Figure 2:
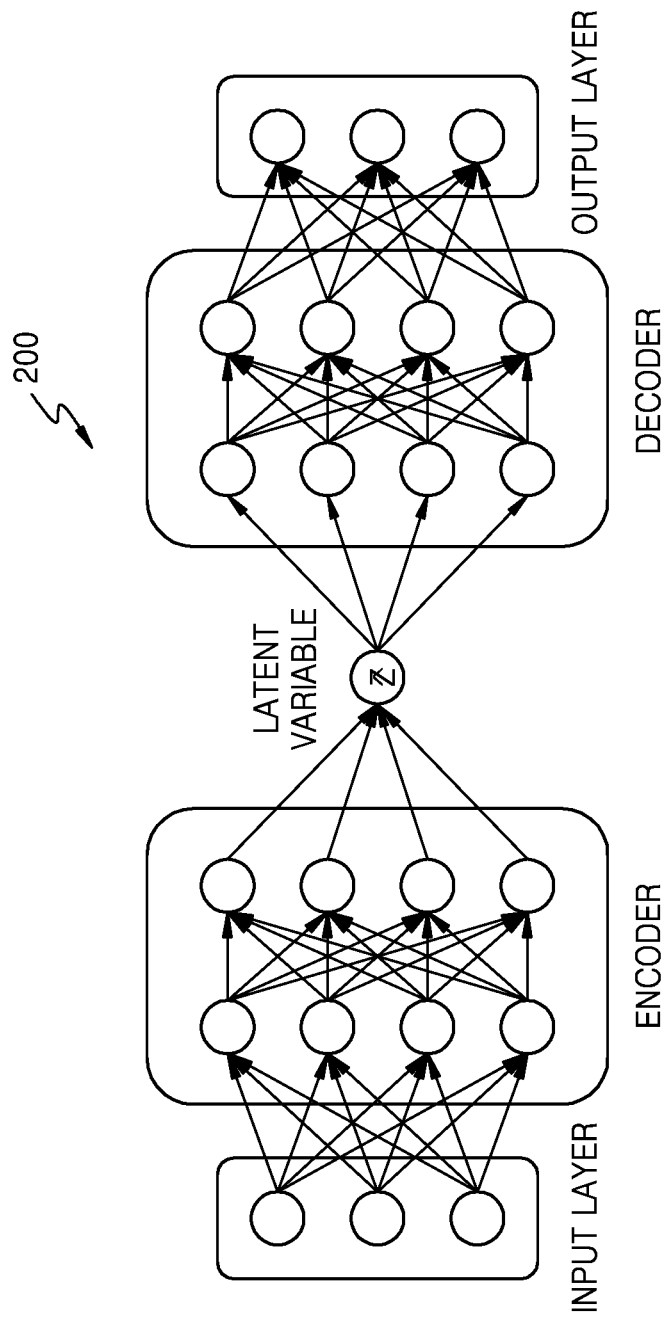
FIG. 2 is a diagram illustrating an example of an operation performed by an autoencoder.

FIG. 2 is a diagram illustrating an example of an operation performed by an autoencoder 200.

Referring to FIG. 2, in an example the autoencoder 200 includes an input layer, an encoder, a decoder, and an output layer. The encoder may also be referred to as a recognition network, and the decoder may also be referred to as a generative network.

In the input layer of the autoencoder 200, high-dimensional data, such as, for example, an image stored in a database is used as input data. In an example, in the encoder of the autoencoder 200, encoding is performed in which the high-dimensional input data is converted to a latent variable z of a lower dimension is performed. In an example, the latent variable $\hat{Z}$ generally may be data of 2 to 50 dimensions. In an example, in the decoder, a latent variable $\hat{Z}$ of a low dimension is decoded, and thus, reconstructed data (high-dimensional data) may be output in the output layer For example, when an image of a human shape is used as input data, the latent variable may be information in which a shape of a subject, camera coordinates (view point), and a light source are nonlinearly mixed. In an example, when a numeric image is used as input data, the latent variable may be information in which an angle of a line and an aspect ratio are non-linearly mixed.

A difference between the input data of the input layer and the reconstruction data of the output layer is referred to as a loss function. In other words, as the input data and the restored data coincide with each other, the value of a loss function of the autoencoder 200 is reduced. The autoencoder 200 may be taught to minimize the loss function. In an example, the autoencoder 200 may be taught to minimize the loss function by using a back-propagation technique, and a mean squared error (MSE) may be used as the loss function.

Figure 3:
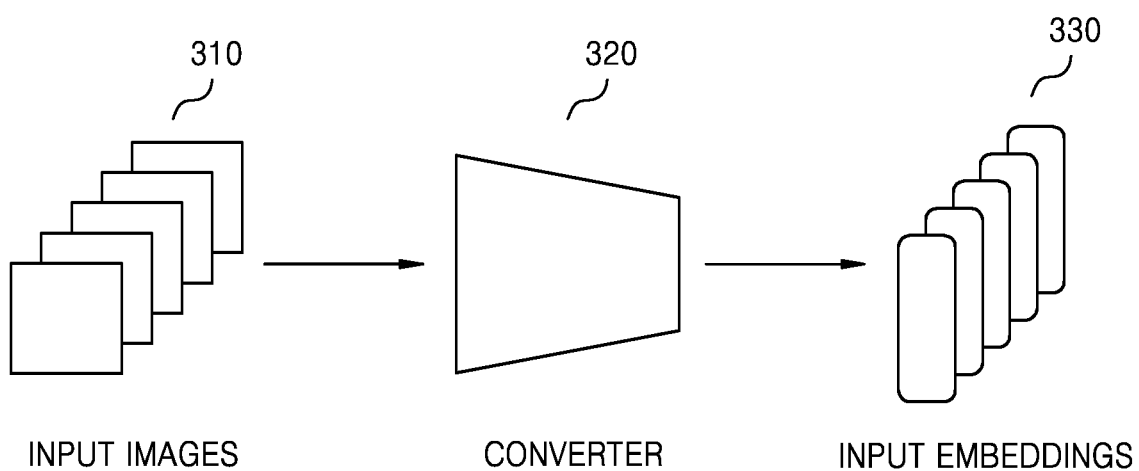
FIG. 3 is a diagram illustrating an example of a process of generating an input embedding.

FIG. 3 is a diagram illustrating an example of generating an input embedding.

Referring to FIG. 3, input images 310 may be input to a converter 320. The converter 320 may convert each of the input images 310 into input embeddings 330, which are vector values. Each of the input embeddings 330 may be displayed in a vector space.

In an example, the converter 320 may be a convolutional feature extractor. In this case, the converter 320 may convert the input images 310 into the input embeddings 330 by performing a convolution operation between the input images 310 and kernels.

The size of the input embeddings 330 may be determined based on the size of the input images 310 and the size of the kernel, and, for example, each of the input embeddings 300 may be an 8192-dimensional vector.

In FIG. 3, it is defined that the input images 310 are input to the converter 320, but various data sets besides the input images 310 may be input to the converter 320.

As described below with reference to FIGS. 4A, 4B, and 5, the input embeddings 330 may be utilized as input data that are later used for learning and inference of an autoencoder.

Figure 4A:
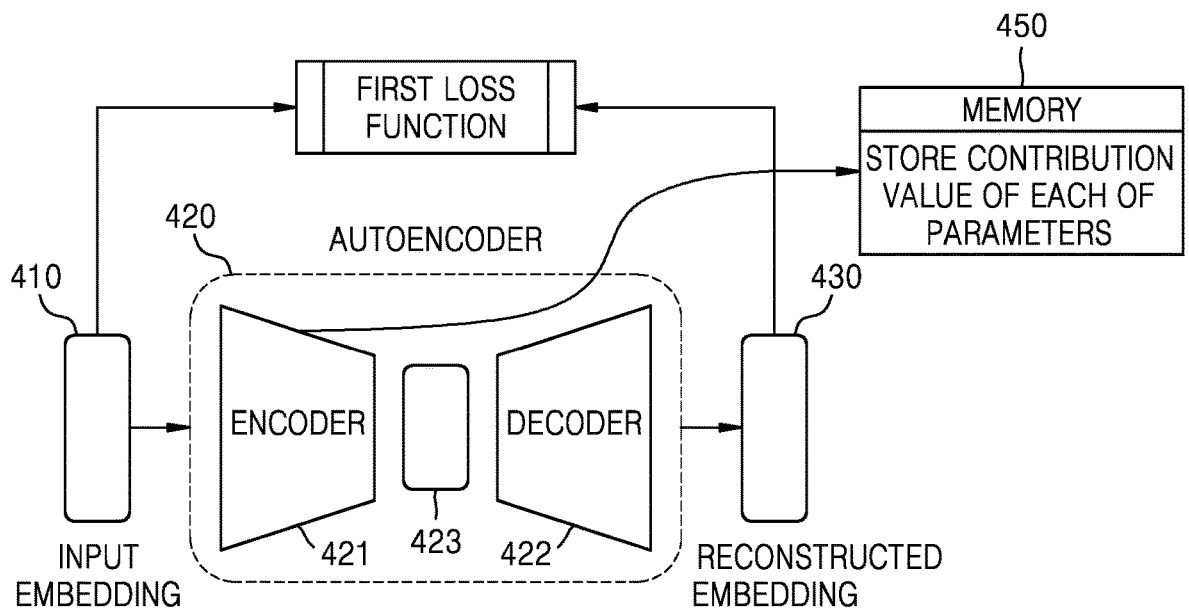
FIGS. 4A and 4B are diagrams illustrating examples of explaining a process of training and retraining autoencoders.
Figure 4B:
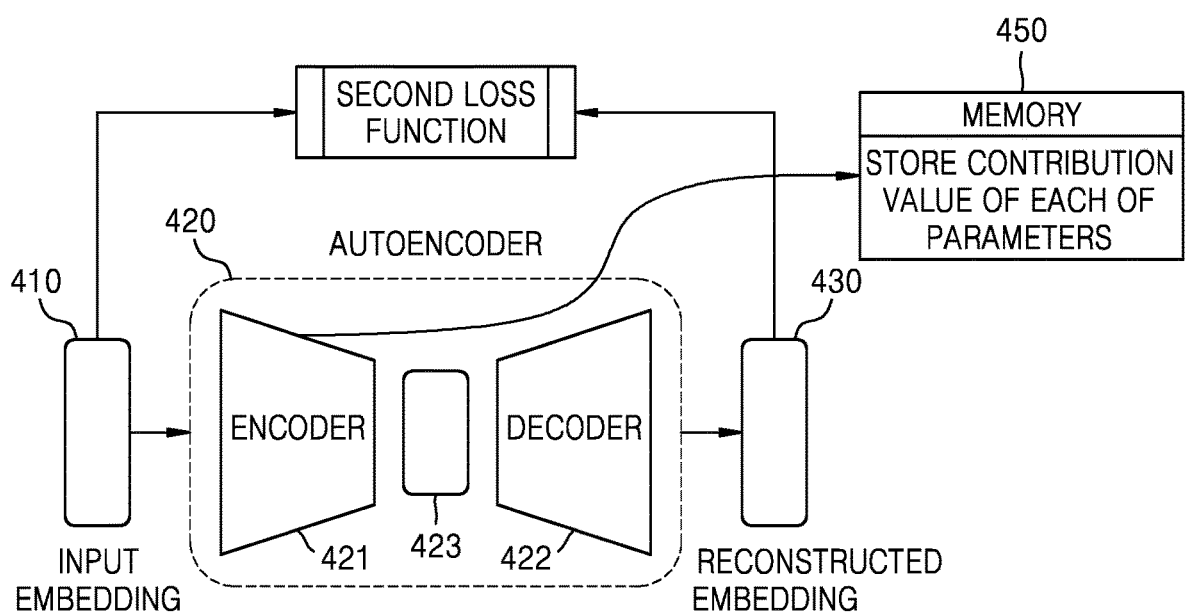

FIGS. 4A and 4B are diagrams illustrating examples of training and retraining an autoencoder 420.

Referring to FIG. 4A, a process of training the autoencoder 420 is depicted. An input embedding 410 may be input to an encoder 421 of the autoencoder 420 as input data. As described with reference to FIG. 3, in an example, the input embedding 410 is a high-dimensional vector and may be converted from an image.

In the encoder 421, encoding is performed where the high-dimensional input embedding 410 is converted into a latent variable 423 of a lower-dimension. A reconstruction embedding 430 of a high-dimension may be output by decoding the latent variable of a lower-dimension in a decoder 422. In an example, the input embedding 410 and the reconstruction embedding 430 are vectors of the same dimension.

A difference between the input embedding 410 and the reconstruction embedding 430 may be referred to as a first loss function. A neural network apparatus may train the autoencoder 420 to minimize the first loss function.

In an operation of training the autoencoder 420, the input embeddings 410 with respect to a first class group may be input to the encoder 421. The first class group includes a plurality of classes, and each of the input embeddings 410 may belong to any one of the classes.

The first loss function $L_{base}$ in an operation of training the autoencoder 420 may be expressed as Equation 1 below. The neural network apparatus may train the autoencoder 420 so that the first loss function $L_{base}$ is minimized by applying a back-propagation technique to the auto encoder 420.

$$L_{base} = \lambda_{MSE} L_{MSE} + \lambda_{cos} L_{cos} + \lambda_{L1} L_{L1} \qquad \text{[Equation 1]}$$

The neural network apparatus may train the autoencoder 420 so that the first loss function $L_{base}$ is minimized, and, for this purpose, $L_{MSE}$, $L_{cos}$, and $L_{L1}$, which are each of the terms of the first loss function $L_{base}$, should be minimized.

In Equation 1, $L_{MSE}$ of the first term indicates a difference between the input embedding 410 and the reconstruction embedding 430. $L_{MSE}$ may be calculated such that differences between the input embedding 410 and the reconstruction embedding 430 are squared and summed, and then averaged by using a mean squared error (MSE) technique.

In Equation 1, $L_{cos}$ of the second term relates to cosine similarity with respect to the paired latent variables 423.

In an example, the neural network apparatus may convert a number of input embeddings 410 input to encoder 421 into a number of latent variables 423. In an example, the neural network apparatus may pair each of the number of latent variables 423 with each other and calculate cosine similarity between the paired latent variables 423.

Since each of the input embeddings 410 belongs to any one of a plurality of classes included in the first class group, the latent variables 423 converted from the input embeddings 410 may also belong to any one of the classes. When the paired latent variables 423 belong to the same class, the neural network apparatus may calculate a value related to the cosine similarity as '1-cosine similarity', and when the paired latent variables 423 belong to different classes, the neural network apparatus may calculate a value related to the cosine similarity as 'cosine similarity'. The neural network apparatus may finally calculate the $L_{cos}$ after calculating values related to cosine similarity of the paired latent variables 423 and summing all the calculated values based on class equality.

In other words, in order to minimize the first loss function $L_{base}$, $L_{cos}$ may be minimized. Since the cosine similarity is close to 1 when paired latent variables 423 belong to the same class, '1-cosine similarity' is used to bring the cosine similarity value closer to zero, and since the cosine similarity is close to 0 when paired latent variables 423 belong to different classes, cosine similarity may be used to minimize the $L_{cos}$.

On the other hand, when the number of paired latent variables 423 increases, the time required for calculation may increase. In an example, the neural network apparatus may calculate the cosine similarity with respect to only a number of paired latent variables 423. In an example, if the number of latent variables 423 (corresponding to the size of a batch of input embeddings 410) is four, total 6 pairs (402) of paired latent variables 423 are generated, but the neural network apparatus may arbitrary select only four of the latent variables 423 (the same value as the size of the batch) and may calculate the cosine similarity.

Since $L_{cos}$ is included in the first loss function $L_{base}$, the latent variables 423 that belong to different classes may be clearly distinguished in a vector space.

In another example, $L_{L2}$ may be included in Equation 1 instead of $L_{cos}$. In this case, when the paired latent variables 423 belong to the same class, $L_{L2}$ may be minimized by controlling a distance L2 to be closer, and when the paired latent variables 423 belong to different classes, $L_{L2}$ may be minimized by controlling the distance L2 to be farther. In this way, instead of using $L_{cos}$, the first loss function $L_{base}$ may be configured by changing the distance measurement according to whether the paired latent variables 423 belong to the same class or not.

In Equation 1, $L_{L1}$ in the third term is related to L1-norm. $L_{L1}$ plays a role of enhancing the effect of $L_{cos}$. Since $L_{L1}$ is included in the first loss function $L_{base}$, vector elements of the latent variables 423 have values close to zero. As a result, latent variables 423 that belong to different classes are located in different quadrants in a vector space, and thus, the latent variables 423 that belong to different classes may be more clearly distinguished in the vector space. In other words, as the latent variables 423 that belong to different classes are located in different quadrants in the vector space, cosine similarity between the latent variables 423 that belong to different classes is reduced.

In Equation 1, $\lambda_{MSE}$, $\lambda_{cos}$ and $\lambda_{L1}$ are constants that determine the importance of each term.

Meanwhile, the first loss function $L_{base}$ of Equation 1 is described as including terms related to $L_{MSE}$, $L_{cos}$, and $L_{L1}$. In another example, the first loss function $L_{base}$ may include only terms related to $L_{MSE}$ and $L_{cos}$.

In an operation of training the autoencoder 420, a contribution value of each of parameters included in the autoencoder 420 may be calculated. The contribution value of each of the parameters may be stored in a memory 450.

In order to minimize the first loss function $L_{base}$, the parameters of the autoencoder 420 may have an optimal value. In other words, when the auto encoder 420 is trained to minimize the first loss function $L_{base}$, the parameters of the auto encoder 420 have an optimal value.

When the optimal value of the parameters is changed, the first loss function $L_{base}$ is increased, and the quantification of the degree of contribution to the variation of the first loss function $L_{base}$ for each parameter is a contribution value of each of the parameters. For example, when a first parameter and a second parameter are changed to the same degree, if $L_{base}$ is increased greater by the change of the first parameter than the change of the second parameter, it may be stated that the contribution value of the first parameter is greater than that of the second parameter.

In an operation of training the autoencoder 420, a representative value for each of at least one class included in the first class group may be calculated. In detail, the neural network apparatus may convert input embeddings with respect to a specific class included in a first class group into latent variables and calculate a representative value representing the latent variables. For example, the neural network apparatus may calculate an average value of latent variables as a representative value. Since the representative value is also a vector value and has the same dimension as the latent variable, the representative value may be displayed on a vector space of the same dimension as the latent variable.

When a plurality of classes are included in the first class group, the neural network apparatus may calculate a representative value with respect to each of the plurality of classes and may display the calculated representative values in the vector space.

When the training of the autoencoder 420 is completed, the neural network apparatus acquires a test latent variable by inputting a test embedding to the autoencoder 420, and may calculate similarity (for example, cosine similarity) between the test latent variable and the calculated representative values on a vector space. The neural network apparatus may determine a representative value having the highest similarity with the test embedding and may classify the test embedding into a class corresponding to the determined representative value.

A process of classifying the class of the test embedding is expressed as Equation 2 below. In Equation 2 below, y indicates a predicted class, $\cos(h(x),\mu_i)$ indicates cosine similarity between two input vectors, $h(x)$ indicates a latent variable for test embedding, and $\mu_i$ indicates a representative value calculated with respect to $i^{th}$ class.

$$y = \underset{i \in \{0,1,\ldots,N_c-1\}}{\operatorname{argmin}} \cos(h(x), \mu_i) \qquad \text{[Equation 2]}$$

Meanwhile, the neural network apparatus may train the autoencoder 420 by using first input embeddings with respect to the first class group, and then, retrain the autoencoder 420 by using the second input embeddings with respect to the second class group. Here, since at least one class included in the first class group and at least one class included in the second class group are different, a class increment learning is performed through a process of retraining the autoencoder 420.

Referring to FIG. 4B, a process of retraining the autoencoder 420 is shown. Hereinafter, a description previously given with reference to FIG. 4A will be omitted for convenience.

The second loss function $L_{inc}$ in a retraining of the auto encoder 420 may be expressed as Equation 3 below. The neural network apparatus may train the autoencoder 420 to minimize the second loss function $L_{inc}$ by applying a backpropagation technique to the autoencoder 420.

$$L_{inc} = \lambda_{MSE} L_{MSE} + \lambda_{reg} L_{reg} + \delta \lambda_{cos} L_{cos} + \lambda_{L1} L_{L1} \quad \text{[Equation 3]}$$

The neural network apparatus may train the autoencoder 420 to minimize the second loss function $L_{inc}$, and for this purpose, $L_{MSE}$, $L_{reg}$, $L_{cos}$, and $L_{L1}$, each being a term of the second loss function $L_{inc}$, should be minimized. The descriptions with respect to $L_{MSE}$, $L_{cos}$, and $L_{cos}$ will be omitted because they were given previously with reference to FIG. 4A.

In equation 3, $L_{reg}$ in the second term is related to regularization. In order to prevent catastrophic forgetting from occurring during a relearning process of the autoencoder 420, a term $L_{reg}$ indicating regularization may further be included in the second loss function $L_{inc}$ that is used in the relearning process.

In an example, $L_{reg}$ may be calculated through a synaptic intelligence (SI) method. When the SI method is used to calculate $L_{reg}$, the degree of contribution by a $k^{th}$ parameter to the change of the loss function used in the previous learning of the autoencoder 420 is expressed as a value in which the change in gradient and the change in parameter are multiplied.) The above description may be expressed as Equation 4 below. In Equation 4, $grad_k(\theta(t))$ represents the change amount of gradient and $$\frac{d\theta_k(t)}{dt}$$

represents the change amount of a parameter.

$$w_k^n = \int_{t_{n-1}}^{t_n} grad_k(\theta(t)) \frac{d\theta_k(t)}{dt} dt \quad \text{[Equation 4]}$$

The neural network apparatus continues to accumulate the degree of contribution $w_k^n$ until the relearning of the autoencoder 420 ends, a contribution value $\Omega_k^n$ of a $k^{th}$ parameter may be calculated by regularizing the total amount of change of the parameter. The above description may be expressed as Equation 5 below.

$$\Omega_k^n = \Sigma_{n_i < n} \frac{w_k^{n_i}}{(\Delta_k^{n_i})^2 + \xi} \quad \text{[Equation 5]}$$

$L_{reg}$ may be defined as shown in Equation 6 by using the contribution values of each of the plurality of parameters included in the autoencoder 420.

$$L_{reg} = \Sigma_k \Omega_k^n (\widetilde{\theta}_k - \theta_k)^2 \quad \text{[Equation 6]}$$

In another embodiment, $L_{reg}$ may be calculated through a memory aware synapses (MAS) method. The MAS method is similar to the SI method, but the method of calculating a contribution for each parameter is different.

When the MAS method is used, the neural network apparatus may calculate a contribution value for each parameter by regularizing an L2-norm value of a gradient to a number N of all data observed in a relearning process. The above description may be expressed as Equation 7 below.

$$\Omega_k^n = \frac{1}{N} \sum_{i=1}^{N} \|grad_k(x_i)\| \quad \text{[Equation 7]}$$

Even when the MAS method is used, $L_{reg}$ may be defined as in Equation 6.

Meanwhile, in Equation 3, $\lambda_{MSE}$, $\lambda_{reg}$, and $\lambda_{L1}$ are constants that determine the importance of each term. Also, $\delta$ has a value of 0 when the number of classes used for relearning an autoencoder is 1 and has a value of 1 when the number of classes used for training an autoencoder is 2 or more.

It is described that the second loss function $L_{inc}$ of Equation 3 includes terms related to $L_{MSE}$, $L_{cos}$, $L_{reg}$, and $L_{L1}$, but in another embodiment, the second loss function $L_{inc}$ may include only the terms related to $L_{MSE}$ and $L_{reg}$.

In an operation of retraining the autoencoder 420, a contribution value of each of the parameters included in the autoencoder 420 may be updated. The contribution value of each of the updated parameters may be stored in the memory 450.

In detail, in the learning operation of the autoencoder 420, an input embedding with respect to at least one class included in the first class group is used, and in the relearning operation, an input embedding with respect to at least one class included in the second class group is used. At this time, since at least some of the classes included in the first class group and the second class group are different from each other, the contribution value of each of the parameters calculated in the operation of learning the autoencoder 420 and the contribution value of each of the parameters calculated in the operation of retraining the autoencoder 420 may be different. Accordingly, in the operation of retraining the autoencoder 420, the neural network apparatus may update the contribution value of each of the parameters included in the autoencoder 420.

The second loss function $L_{inc}$ in the retraining of the autoencoder 420 includes a term $L_{reg}$ related to regularization, and this is to prevent the occurrence of catastrophic forgetting in a process of relearning the autoencoder 420. That is, the neural network apparatus may prevent the occurrence of catastrophic forgetting with respect to the contribution value of each of the parameters calculated in the learning operation of the autoencoder 420 by retraining the autoencoder 420 based on the second loss function $L_{inc}$ including the term $L_{reg}$ related to regularization.

When the relearning of the autoencoder 420 is completed, the neural network apparatus acquires a test latent variable by inputting a test embedding to the autoencoder 420 and may calculate similarity (for example, cosine similarity) between the test latent variable and the calculated representative values on a vector space. The neural network apparatus may determine a representative value having the highest similarity with the test embedding and may classify the test embedding into a class corresponding to the determined representative value. A process of classifying the class of the test embedding is expressed as Equation 2.

In an example, a class incremental learning is performed by combining an autoencoder and a regularization technique, and thus, an operation speed may be increased by reducing the amount of computations and may reduce a memory capacity required for data storage.

In an example, it may be unnecessary to store all of input embeddings with respect to the first class group, and it may be unnecessary to separately generate similar embeddings (for example, pseudo-samples), and thus, a memory capacity may be reduced. Also, since an additional computation for operations of sorting and writing input embeddings may not be needed, the amount of calculations may be reduced, and accordingly, a calculation speed may be increased.

Figure 5:
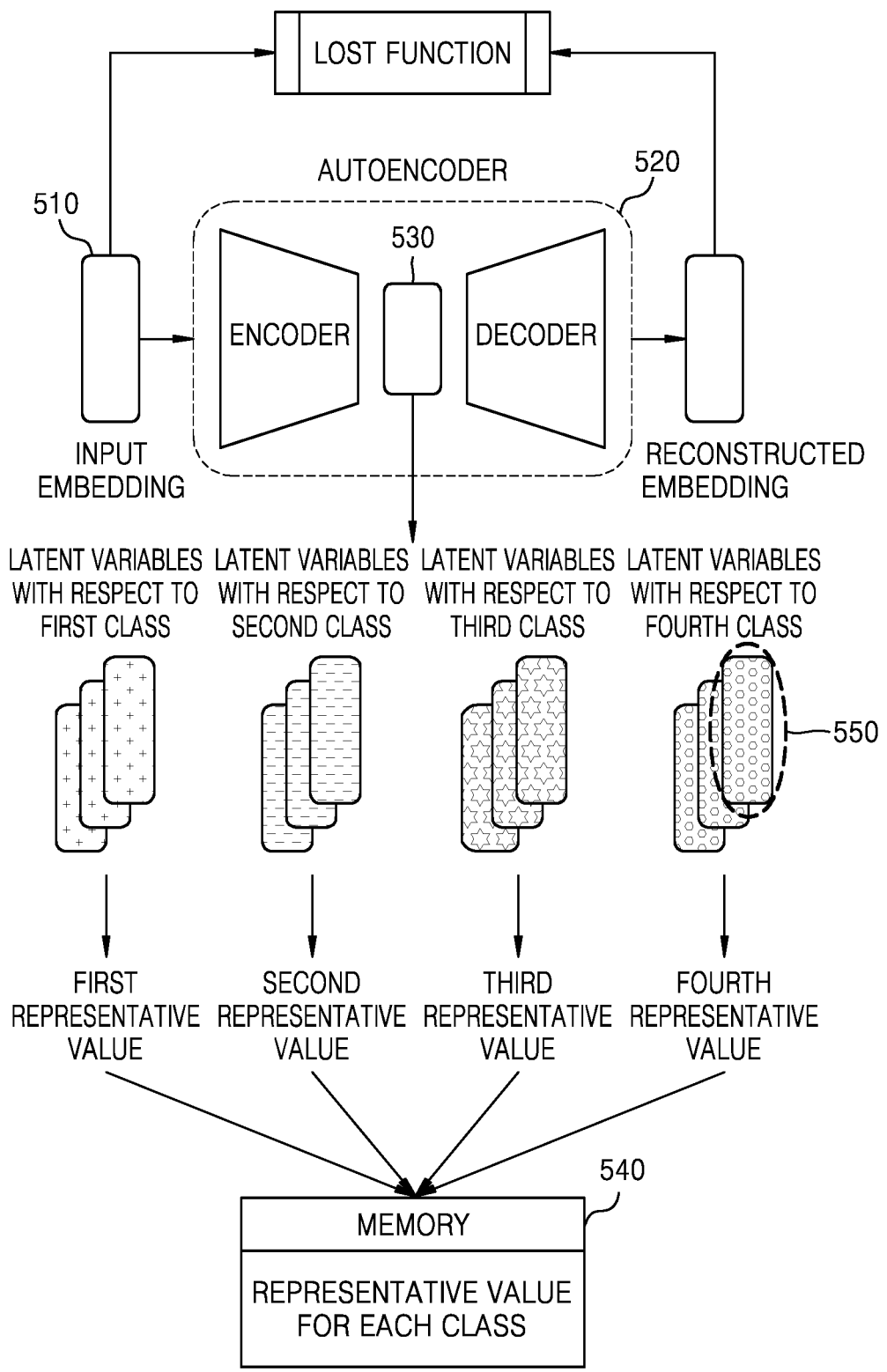
FIG. 5 is a diagram illustrating an example of a process of calculating a representative value of latent variables.

FIG. 5 is a diagram illustrating an example of a process of calculating a representative value of latent variables.

Referring to FIG. 5, a neural network apparatus may convert input embeddings 510 with respect to a specific class into latent variables 530 by using an autoencoder 520. Also, the neural network apparatus may calculate an average value of the latent variables 530 as a representative value. The calculated representative values may be stored in a memory 540.

For example, in a process of training and retraining the autoencoder 520, the neural network apparatus may convert the input embeddings with respect to the first class into latent variables and may calculate a first representative value representing the latent variables. In a similar manner, the neural network apparatus may convert the input embeddings with respect to a second class through a fourth class to latent variables and may calculate second through fourth representative values respectively representing the latent variables.

Since the first through fourth representative values are also vector values and have the same dimension as the latent variable 530, the first through fourth representative values may be displayed on a vector space of the same dimension as the latent variable 530.

When a learning and relearning of the autoencoder 520 is completed, the neural network apparatus acquires a test latent variable by inputting a test embedding to the autoencoder 520 and may calculate similarity (for example, cosine similarity) between the test latent variable and the calculated representative values on a vector space. The neural network apparatus may determine a representative value having the highest similarity with the test embedding and classify the test embedding into a class corresponding to the determined representative value.

In the embodiment described above, when the representative value having the highest similarity with the test embedding is determined as the first representative value, the neural network apparatus may classify the test embedding into a first class.

In an embodiment, the neural network apparatus may consider latent variables having a difference from a representative value exceeding a threshold value for each class as outliers among the latent variables and may remove the latent variables. For example, in order to remove the latent variables considered as outliers, a local outlier factor technique may be used, but the present embodiment is not limited thereto.

In other words, the neural network apparatus may select latent variables having a difference from the representative value for each class below the threshold value among the latent variables. The latent variables having a difference from the representative value less than or equal to the threshold value may refer to latent variables located close to the representative value in a vector space. The neural network apparatus may increase learning performance by learning the autoencoder 520 based on input embeddings corresponding to the selected latent variables.

For example, if a specific latent variable 550 of the latent variables for the fourth class is considered an outlier, the neural network apparatus may remove the specific latent variable 550 and may train the autoencoder 520 based on input embeddings corresponding to the remaining latent variables.

A process of removing the latent variables considered as outliers may be performed in learning and relearning operations of the autoencoder 520. In another example, the process of removing the latent variables considered as outliers may be performed only in the learning operation of the autoencoder 520.

In an example, when the autoencoder 520 is trained based on the input embeddings corresponding to the selected latent variables, the neural network apparatus may use a third loss function $L_{add}$. The third loss function $L_{add}$ may be expressed as Equation 8 below.

$$L_{add} = \lambda_{center} L_{center} + \lambda_{cos} L_{cos} \quad \text{[Equation 8]}$$

Since $L_{cos}$ of Equation 8 has been described above with reference to FIG. 4A, the description thereof will be omitted.

$L_{center}$ of Equation 8 is a term that makes a latent variable of each class approach a representative value of each class, and may be expressed as Equation 9 below. In Equation 9, h(x) represents a latent variable and $\mu_{new,i}$ represents a newly calculated representative value for an $i^{th}$ class after an outlier is removed.

$$L_{center} = \Sigma_i \|h(x) - \mu_{new,i}\|^2 \quad \text{[Equation 9]}$$

Figure 6:
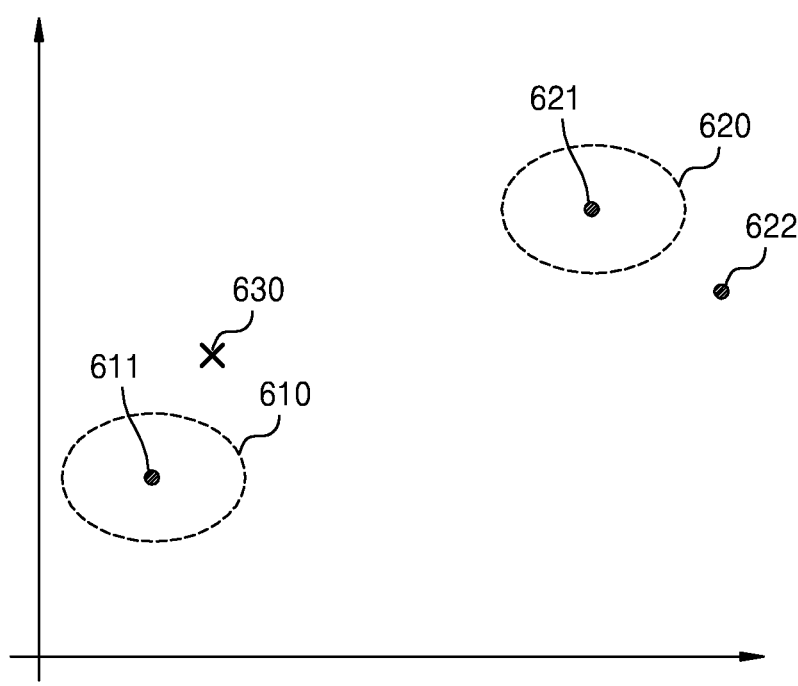
FIG. 6 is a diagram illustrating an example of a method of classifying a class of training embeddings.

FIG. 6 is a diagram illustrating an example of a method of classifying a class of training embeddings.

The neural network apparatus may convert input embeddings for a specific class into latent variables using an autoencoder. Also, the neural network apparatus may calculate an average value of latent variables as a representative value. Since the representative value is also a vector value and has the same dimension as a latent variable, the representative value may be displayed on a vector space of the same dimension as the latent variable.

Referring to FIG. 6, latent variables and representative values of the latent variables for a plurality of classes may be displayed on a two-dimensional vector space. In FIG. 6, for convenience of explanation, a two-dimensional vector space is assumed, but latent variables and representative values of the latent variables may be displayed in a high-dimensional vector space.

For example, latent variables for a first class may be displayed in a first region 610. Also, latent variables for a second class may be displayed in a second region 620.

The neural network apparatus may calculate an average value of the latent variables displayed in the first region 610 and may determine the average value as a first representative value 611 for the first class. Also, the neural network apparatus may calculate an average value of latent variables displayed in the second region 620 and may determine the average value as a second representative value 621 for the second class.

In an example, the neural network apparatus may remove an outlier 622, which is not displayed in the second region 620, among the latent variables for the second class. The neural network apparatus may calculate the second representative value 621 using the latent variables displayed in the second region 620 after removing the outlier 622.

After learning and relearning of the autoencoder is completed, the neural network apparatus may obtain a test latent variable 630 by inputting a test embedding to the autoencoder and may display the test latent variable 630 in a vector space.

The neural network apparatus may calculate a cosine similarity between the test latent variable 630 and the first representative value 611 and the second representative value 621. The neural network apparatus may determine that the test latent variable 630 and the first representative value 611 have a high similarity and classify the test embedding corresponding to the test latent variable 630 into a first class.

Figure 7:
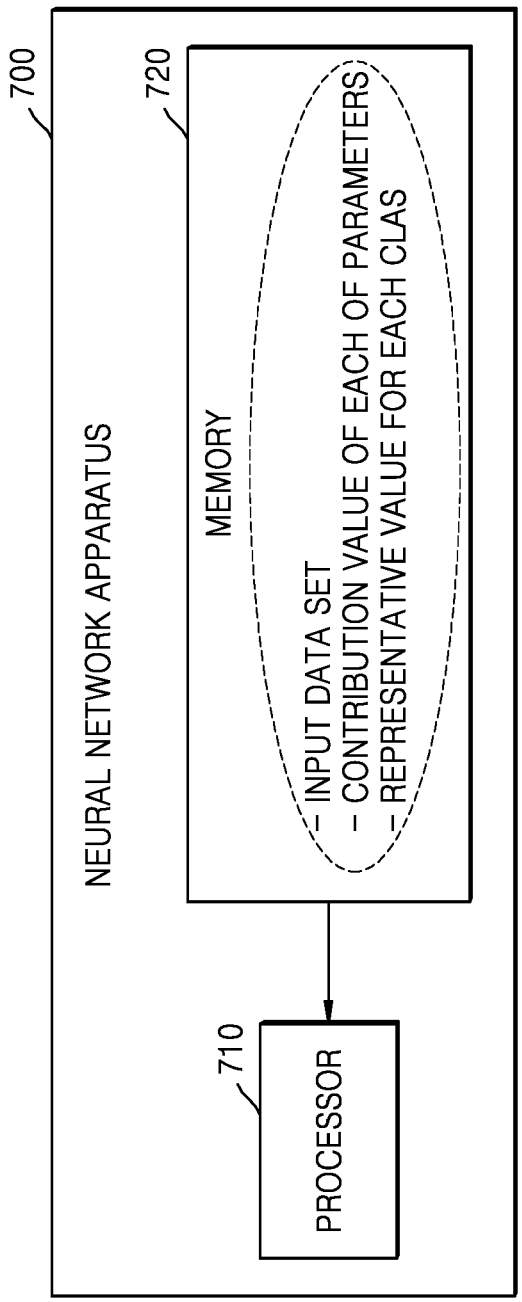
FIG. 7 is a diagram illustrating an example of a hardware configuration of a neural network apparatus.

FIG. 7 is a diagram illustrating an example of a hardware configuration of a neural network apparatus 700.

The neural network apparatus 700 may be implemented by various types of devices, such as, for example, a smartphone, a mobile phone, a personal computer (PC), a server, a mobile device, an embedded device, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a walking assistance device, a smart speaker, a robot, an Augmented Reality (AR) device, a medical device, various Internet of Things (IoT) devices, a smart car, an autonomous vehicle, an automatic or autonomous driving system, an intelligent vehicle, an advanced driver assistance system (ADAS), a head-up display (HUD), and an augmented reality head-up display (AR HUD), and may be performed by an application, middleware, or an operating system installed on a user device, or a program of a server interoperating with the corresponding application.

In another example, the neural network apparatus 700 may correspond to a smartphone that performs functions such as, for example, voice recognition, image recognition, and image classification. Furthermore, the neural network apparatus 700 may correspond to a dedicated hardware accelerator (HW accelerator) mounted on the devices described above, and the neural network apparatus 700 may be a hardware accelerator, such as, for example, a neural processing unit (NPU), a tensor processing unit (TPU), and a neural engine which are dedicated modules for driving a neural network.

Referring to FIG. 7, the neural network apparatus 700 includes a processor 710, a memory 720, and an input/output interface (not shown). In FIG. 7, although only constituent elements related to the neural network apparatus 700 are illustrated, other general constituent elements may be included without departing from the spirit and scope of the illustrative examples described.

The processor 710 controls overall functions for executing the neural network apparatus 700. For example, the processor 710 generally controls the neural network apparatus 700 by executing programs stored in the memory 720 in the neural network apparatus 700. The processor 710 may be a data processing device implemented by hardware including a circuit having a physical structure to perform desired operations. For example, the desired operations include instructions or codes included in a program. For example, the hardware-implemented data processing device includes a microprocessor, a central processing unit (CPU), a graphics processing unit (GPU), an application processor (AP), a multi-core processor, a reconfigurable processor, a multicore processor, a multiprocessor, an application-specific integrated circuit (ASIC), and a field programmable gate array (FPGA), or any other type of multi- or single-processor configuration. Further details regarding the processor 710 is provided below.

The memory 720 is hardware for storing various data processed in the neural network apparatus 700, and, for example, the memory 720 may store data processed and data to be processed in the neural network apparatus 700. Also, the memory 720 may store applications, drivers, etc. to be driven by the neural network apparatus 700. The memory 720 may include random access memory (RAM), such as dynamic random access memory (DRAM), static random access memory (SRAM), etc., read-only memory (ROM), electrically erasable programmable read-only memory (EEPROM), CD-ROM, Blu-ray or other optical disk storage, hard disk drive (HDD), solid state drive (SSD), or flash memory. The memory 720 includes a large capacity storage medium such as a hard disk to store the variety of data. The memory 720 stores at least a portion of information argumentized at a terminal of a user, or stores a program implementing an operating method of the neural network apparatus 700. The memory 720 is a volatile memory or a non-volatile memory. The memory 720 includes a large capacity storage medium such as a hard disk to store the variety of data. Further details regarding the memory 720 is provided below.

The processor 710 executes the program, and controls the neural network apparatus 700. Program Codes executed by the processor 710 are stored in the memory 720. The neural network apparatus 700 is connected to an external device (for example, a personal computer or a network) through an input/output device (not shown), and exchanges data therewith. In an example, the neural network apparatus 700 interacts with the user through the input/output interface (not shown).

In an operation of training an autoencoder, the memory 720 may store contribution values of each of the parameters included in the autoencoder. Also, the memory 720 may store a representative value for each of at least one class used in a learning operation.

In an operation of retraining an autoencoder, the memory 720 may update the contribution value of each of the previously stored parameters. Also, the memory 720 may store a representative value for each of the at least one class used in the relearning operation.

The processor 710 reads/writes neural network data, for example, input data set, parameter data, contribution value for each parameter, representative value for each class, etc. from the memory 720, and executes the neural network by using the read/write data. When the neural network is executed, the processor 710 may repeatedly perform a convolution operation.

In an example, the input/output interface (not shown) may be a display that receives an input from a user or provides an output. In an example, the input/output interface (not shown) may function as an input device and receives an input from a user through a traditional input method, for example, a keyboard and a mouse, and a new input method, for example, a touch input, a voice input, and an image input.

In an example, the input/output interface (not shown) may function as an output device, and provide an output of the neural network apparatus 700 to a user through a visual, auditory, or tactile channel. The input/output interface (not shown) may include, for example, a display, a touchscreen, a speaker, a vibration generator, and other devices that may provide an output to a user.

However, the input/output interface (not shown) are not limited to the example described above, and any other displays, such as, for example, computer monitor and eye glass display (EGD) that are operatively connected to the neural network apparatus 700 may be used without departing from the spirit and scope of the illustrative examples described.

Figure 8:
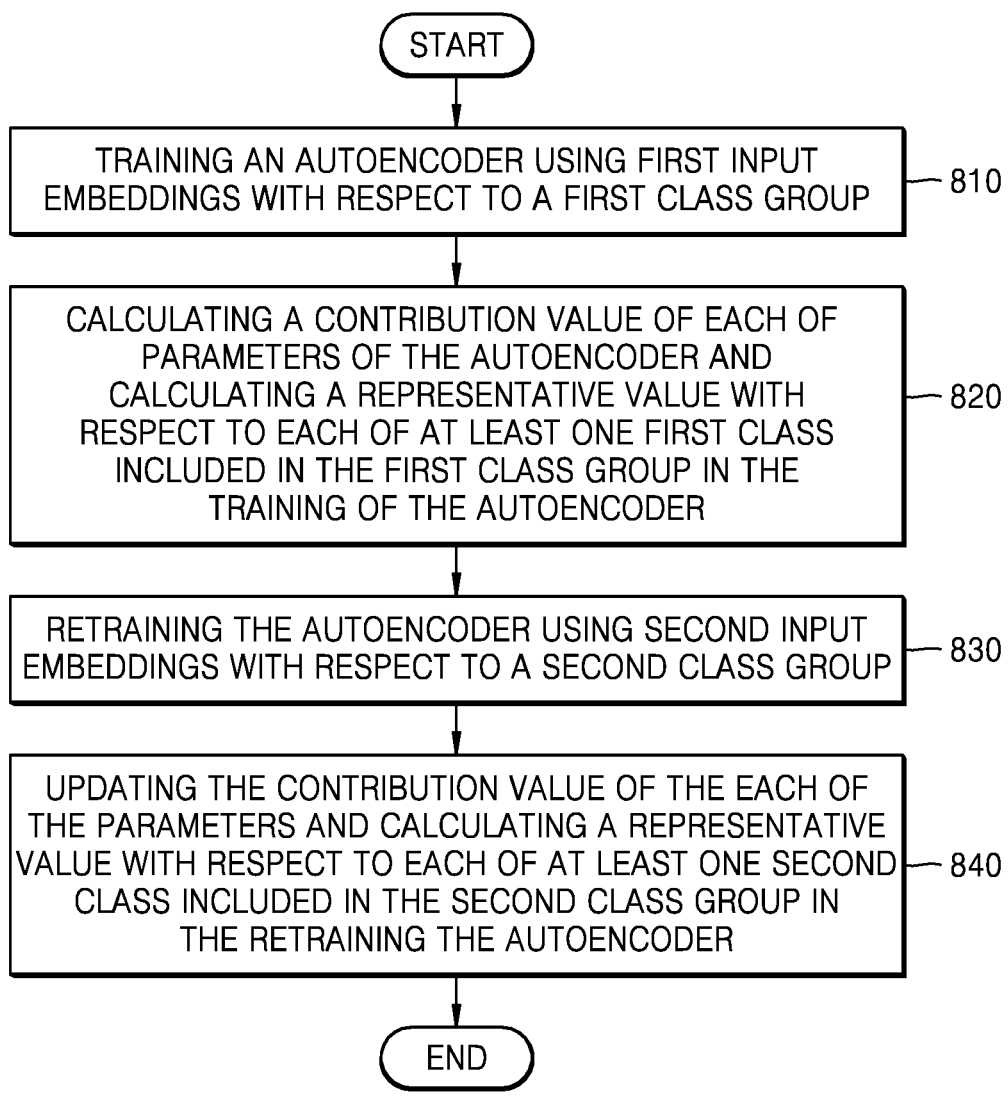
FIG. 8 is diagram illustrating an example of a method of performing a class incremental learning in a neural network apparatus.

FIG. 8 is a diagram illustrating an example of a method of performing a class incremental learning in a neural network apparatus. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8 and are incorporated herein by reference. Thus, the above description may not be repeated here.

Referring to FIG. 8, in operation 810, a neural network apparatus may train an autoencoder by using first input embeddings with respect to a first class group.

In an example, the neural network apparatus may convert an input data set into input embeddings that are vector values. For example, the neural network apparatus may convert an input data set into input embeddings using a convolutional feature extractor.

The autoencoder includes an encoder and a decoder. The neural network apparatus may convert the first input embeddings into low-dimensional latent variables by using the encoder. Also, the neural network apparatus may generate first reconstruction embeddings from latent variables by using the decoder. The neural network apparatus may train an autoencoder by minimizing a first loss function with respect to the autoencoder such that the first reconstruction embeddings coincide with the first input embeddings.

In an example, the first loss function may be expressed as Equation 1 above. In detail, the first loss function may include a term $L_{MSE}$ indicating a difference between an input embedding and a restoration embedding, a cosine similarity related term with respect to paired latent variables, and an L1-norm related term.

In operation 820, the neural network apparatus may calculate a contribution value of each of the parameters of the autoencoder and calculate a representative value for each class included in the first class group in a process of training the autoencoder.

In order to minimize the first loss function, the parameters of the autoencoder may have an optimal value. When the optimal value of the parameters is changed, the first loss function increases and a numerical value of the degree of contribution to the amount of change of the first loss function for each parameter is a contribution value for each parameter.

Also, the neural network apparatus may convert input embeddings for a specific class into latent variables and may calculate a representative value representing the latent variables. Since the representative value is also a vector value and has the same dimension as the latent variable, the representative value may be displayed on a vector space of the same dimension as the latent variable.

In operation 830, the neural network apparatus may retrain the autoencoder by using input embeddings for the second class group.

The neural network apparatus may convert the second input embeddings into low-dimensional latent variables by using the encoder. Also, the neural network apparatus may generate second reconstruction embeddings from latent variables by using the decoder. The neural network apparatus may train the autoencoder by minimizing a second loss function for the autoencoder such that the second reconstruction embeddings coincide with the second input embeddings.

Compared with the first loss function of operation 810, the second loss function may further include a term related to regularization based on an updated contribution value of each of the parameters.

In order to prevent catastrophic forgetting from occurring in a relearning process of the autoencoder, a term $L_{reg}$ indicating regularization may further be included in the second loss function used in the relearning process.

In an example, $L_{reg}$ may be calculated through a synaptic intelligence (SI) method or a memory aware synapses (MAS) method, but is not limited thereto.

In operation 840, the neural network apparatus may update the contribution value of each parameter in the course of retraining the autoencoder and may calculate a representative value with respect to each of at least one class included in the second class group.

In detail, at least one class used in the learning operation of the autoencoder and at least one class used in the relearning operation of the autoencoder may be different from each other. Accordingly, the contribution value of each of the parameters calculated in the training of the autoencoder and the contribution value of each of the parameters calculated in the retraining may be different. In the operation of retraining the autoencoder, the neural network apparatus may update the contribution value when the contribution value of each of the parameters included in the autoencoder is changed.

Also, the neural network apparatus may convert input embeddings with respect to a particular class into latent variables and may calculate a representative value representing the latent variables. Since the representative value is also a vector value and has the same dimension as the latent variables, the representative value may be displayed on a vector space of the same dimension as the latent variables.

When the relearning of the autoencoder is completed, the neural network apparatus acquires a test latent variable by inputting a test embedding to the autoencoder and may calculate similarity (for example, cosine similarity) between the test latent variable and the calculated representative values on a vector space. The neural network apparatus may determine a representative value having the highest similarity with the test embedding and may classify the test embedding into a class corresponding to the determined representative value. A process of classifying the class of the test embedding is expressed as Equation 2 above.

The methods described above may be implemented as a computer-readable program and may be realized in general computers that execute the program by using computer-readable recording media. Also, the structure of data used in the methods described above may be recorded on a computer-readable recording medium through various means. The computer-readable medium may be magnetic storage media (e.g., ROM, floppy disks, hard disks, etc.) and optical recording media (e.g., CD-ROMs or DVDs), and transmission media such as Internet transmission media.

Since a class incremental learning is performed by combining an autoencoder and a normalization technique, the amount of computations is reduced, and as a result, a computation speed is increased and the amount of memory required for storing data is reduced.

The autoencoder, encoder, decoder, converter 320, autoencoder 420, encoder 421, decoder 422, autoencoder 520, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

[Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of performing a class incremental learning in a neural network apparatus. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing a class incremental learning in a neural network apparatus, the method comprising:
   training an autoencoder using first input embeddings with respect to a first class group;
   calculating a contribution value of each of parameters of the autoencoder and calculating a first plurality of representative values with respect to each of at least one first class included in the first class group in the training of the autoencoder;
   retraining the autoencoder using second input embeddings with respect to a second class group; and
   updating the contribution value of the each of the parameters, for the retraining, and calculating a second plurality of representative values with respect to each of at least one second class included in the second class group in the retraining the autoencoder based on a class of the first class group.

2. The method of claim 1, wherein the training of the autoencoder comprises:
   converting the first input embeddings into first latent variables of lower dimensions using an encoder;
   generating first reconstructed embeddings from the first latent variables using a decoder; and
   training the autoencoder by minimizing a first loss function with respect to the autoencoder such that the first reconstruction embeddings coincide with the first input embeddings.

3. The method of claim 2, wherein the retraining of the autoencoder comprises:
   converting the second input embeddings into second latent variables of lower dimensions using the encoder;
   generating second reconstructed embeddings from the second latent variables using the decoder; and
   retraining the autoencoder by minimizing a second loss function with respect to the autoencoder such that the second reconstruction embeddings coincide with the second input embeddings, wherein the second loss function comprises a term related to regularization based on an updated contribution value of each of the parameters.

4. The method of claim 3, wherein the first loss function and the second loss function comprise terms related to cosine similarity with respect to paired latent variables.

5. The method of claim 3, wherein the first loss function and the second loss function comprise a term related to L1-norm.

6. The method of claim 3, wherein:
   the training of the autoencoder comprises converting input embeddings with respect to the at least one first class into the first latent variables and calculating a first representative value representing the first latent variables; and
   the retraining of the autoencoder comprises converting input embeddings with respect to the at least one second class into the second latent variables and calculating a second representative value representing the second latent variables.

7. The method of claim 6, further comprising:
   acquiring a test latent variable, in response to inputting a test embedding into the autoencoder; and
   classifying the test embedding into a class corresponding to a determined representative value among the first representative value and the second representative value that has a greatest similarity with the test latent variable.

8. The method of claim 1, wherein the training of the autoencoder comprises:
   converting an input data set with respect to the first class group into the first input embedding representing a vector value; and
   training the autoencoder using the first input embedding, and
   the retraining of the autoencoder comprises:
   converting an input data set with respect to the second class group into the second input embedding representing another vector value; and
   retraining the autoencoder using the second input embedding.

9. The method of claim 2, wherein the training of the autoencoder comprises:
   converting input embeddings with respect to the at least one first class into the first latent variables and calculating a first representative value representing the first latent variables;
   selecting latent variables having a difference with the first representative value that is less than or equal to a threshold from among the latent variables; and
   training an autoencoder based on input embeddings corresponding to the selected latent variables.

10. A non-transitory computer-readable storage medium storing instructions that, when executed by a processor, cause the processor to perform the method of claim 1.

11. A neural network apparatus that performs a class incremental learning, the neural network apparatus comprising:
    a processor configured to:
       train an autoencoder using first input embeddings with respect to a first class group,
       calculate a contribution value of each of parameters of the autoencoder and a first plurality of representative values with respect to each of at least one first class included in the first class group in the training of the autoencoder,
       retrain an autoencoder using second input embeddings with respect to a second class group, and
       update the contribution value of the each of the parameters, for the retraining, and to calculate a second plurality of representative values with respect to each of at least one second class included in the second class group in retraining the autoencoder using at least one first class of the first class group.

12. The neural network apparatus of claim 11, wherein the processor is further configured to:
convert first input embeddings into first latent variables of lower dimensions using an encoder,
generate first reconstructed embeddings from the first latent variables using a decoder, and
train the autoencoder by minimizing a first loss function with respect to the autoencoder such that the first reconstruction embeddings coincide with the first input embeddings.

13. The neural network apparatus of claim 12, wherein the processor is further configured to:
convert the second input embeddings into second latent variables of lower dimensions using the encoder,
generate second reconstructed embeddings from the second latent variables using the decoder, and
retrain the autoencoder by minimizing a second loss function with respect to the autoencoder such that the second reconstructed embeddings coincide with the second input embeddings,
wherein the second loss function comprises a term related to regularization based on an updated contribution value of each of the parameters.

14. The neural network apparatus of claim 12, wherein the first loss function and the second loss function comprise terms related to cosine similarity with respect to paired latent variables.

15. The neural network apparatus of claim 12, wherein the first loss function and the second loss function comprise a term related to L1-norm.

16. The neural network apparatus of claim 13, wherein the processor is further configured to:
converts input embeddings with respect to the at least one first class into the first latent variables and to calculate a first representative value representing the first latent variables in training the autoencoder; and
convert input embeddings with respect to the at least one second class into the second latent variables and to calculate a second representative value representing the second latent variables in retraining the autoencoder.

17. The neural network apparatus of claim 16, wherein the processor is further configured to:
acquire a test latent variable, in response to inputting a test embedding into the autoencoder; and
classify the test embedding into a class corresponding to a determined representative value among the first representative value and the second representative value that has a greatest similarity with the test latent variable.

18. The neural network apparatus of claim 11, wherein the processor is further configured to:
convert an input data set with respect to the first class group into the first input embedding representing a vector value,
train the autoencoder using the first input embedding,
convert an input data set with respect to the second class group into the second input embedding that represents another vector value, and
retrain the autoencoder using the second input embedding.

19. The neural network apparatus of claim 12, wherein the processor is further configured to:
convert input embeddings with respect to the at least one first class into the first latent variables and to calculate a first representative value representing the first latent variables,
select latent variables having a difference with the first representative value that is less than or equal to a threshold from among the latent variables, and
train an autoencoder based on input embeddings corresponding to the selected latent variables.

20. The neural network apparatus of claim 11, further comprising a memory configured to store the contribution value of each of the parameters, the first plurality of representative values, and the second plurality of representative values.

* * * * *